May 6, 1958 K. KARSTAD 2,833,991

BALANCED MODULATOR

Filed Dec. 11, 1953

INVENTOR.

KAARE KARSTAD

BY D. A. Reckif

AGENT 2,833,991
Patented May 6, 1958

2,833,991

BALANCED MODULATOR

Kaare Karstad, Princeton, N. J., assignor to Radio Corporation of America, a corporation of Delaware Application December 11, 1953, Serial No. 397,515
6 Claims. (Cl. 332—43)

This invention relates to modulators, and more particularly to balanced modulators.

An object of this invention is to provide an improved balanced modulator, in which self-balancing of the modulator takes place, thus tending to counteract any dissimilarities between the two parts of the modulator.

Another object is to devise an improved balanced modulator in which the tendency of the modulator to produce carrier wave output in the absence of a modulating signal, is minimized.

A further object is to provide a balanced modulator whose modulation characteristic is more linear than those of prior art modulators.

The objects of this invention are accomplished, briefly, in the following manner: two modulator tubes are driven in push-pull with carrier wave energy and have their anodes connected in parallel to an output circuit. The modulating signal is fed in push-pull to the grids of the two tubes, thus providing a balanced modulator. A portion of the output signal, from the common output circuit, is fed back to the two modulator tubes in such a way that the feedback voltage in effect increases the gain of the tube having the least amplification and in effect decreases the gain of the tube having the greatest amplification. In one embodiment, the feedback voltage is applied to the cathodes of the two modulator tubes through an amplifier tube, while in another embodiment the feedback voltages are applied directly from the output circuit to the input or grid circuits of the two modulator tubes.

The foregoing and other objects of the invention will be better understood from the following description of some exemplifications thereof, reference being had to the accompanying drawing, wherein.

Figure 1:
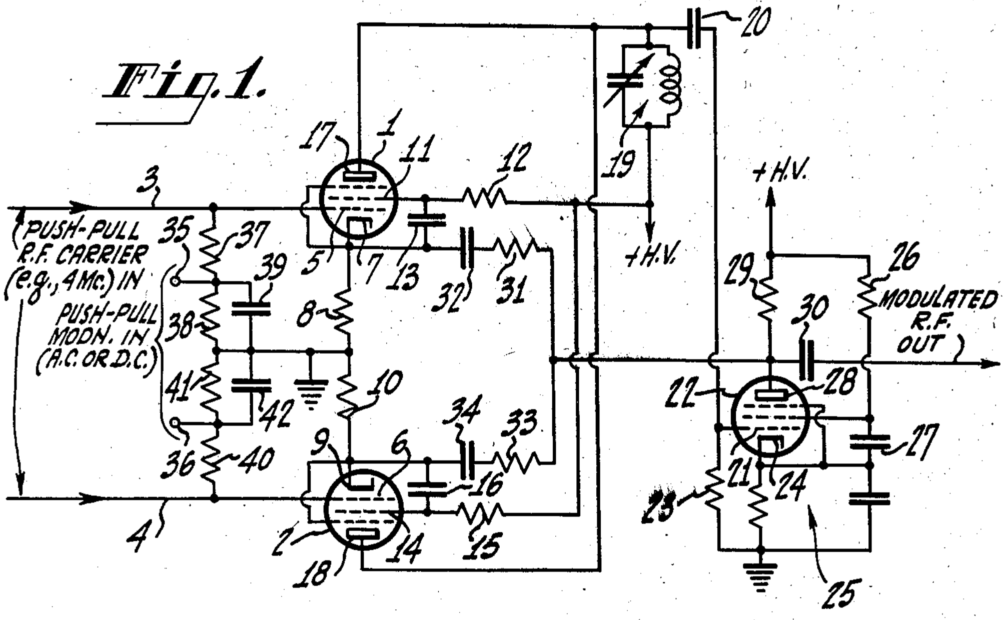
Fig. 1 is a circuit diagram of one embodiment of the invention.

Now referring to Fig. 1, the pentode vacuum tubes 1 and 2, for example of the 6AK5 type, are the two modulator tubes constituting the heart of the balanced modulator of this invention. These tubes are driven in push-pull by means of leads 3 and 4 connected to opposite sides of a push-pull driving source of radio frequency carrier energy (having a frequency of 4 mc., for example) and respectively connected to control grids 5 and 6 of tubes 1 and 2. Cathode 7 of tube 1 is connected through a resistor 8 to ground or the negative terminal of the unidirectional potential source, while cathode 9 of tube 2 is connected through a resistor 10 to ground. The screen grid 11 of tube 1 is connected via a resistor 12 to the positive terminal +H. V. of the unidirectional potential source and is bypassed by a capacitor 13 connected from screen 11 to cathode 7. Likewise, the screen grid 14 of tube 2 is connected via a resistor 15 to the positive terminal +H. V. and is bypassed by a capacitor 16 connected from screen 14 to cathode 9.

The anode 17 of tube 1 and the anode 18 of tube 2 are connected directly together and to a common anode load 19, shown as a parallel LC circuit, so it may be stated that the two anodes are connected in parallel to the common load 19. Positive anode polarizing potential is supplied to anodes 17 and 18 by way of the load 19, the lower end of which is connected to the positive terminal +H. V., so that the anode direct current of both tubes 1 and 2 flows through the inductance of circuit 19. Output from the tubes 1 and 2 of the balanced modulator is taken off from the anode end of the common anode load 19 and applied through a coupling capacitor 20 to the control grid 21 of a pentode vacuum tube 22 connected to act as an amplifier. Tube 22 may be of the 6AU6 type, for example. A grid leak resistor 23 is connected from grid 21 to ground, while the cathode 24 of tube 22 is connected to ground through a conventional RC biasing network 25. The screen grid of tube 22 is connected via a resistor 26 to the positive terminal +H. V. and is bypassed by a capacitor 27 connected from the screen grid to cathode 24.

The anode 28 of tube 22 is connected through an anode load resistor 29 to the positive terminal +H. V., the circuit arrangement of tube 22 described thus being such that tube 22 operates to amplify the output of tubes 1 and 2, and the amplified output is taken off from the anode end of resistor 29 through a coupling capacitor 30.

The operation of the Fig. 1 circuit as so far described, with no modulating signal and with only carrier wave excitation applied to tubes 1 and 2, will now be set forth. The tubes 1 and 2 are driven in push-pull with their anodes connected in parallel. Thus, if the tubes 1 and 2 are identical and if the two input signals applied by connections 3 and 4 are of the same amplitude and of exactly opposite phase (that is, if an "ideal" push-pull carrier drive is provided), the alternating anode currents flowing through the two tubes will be equal and opposite in the common anode load 19 and will cancel in such common load, giving a net output voltage of zero across this load.

In actual practice, however, the tubes 1 and 2 will not be identical, and it is also quite difficult to provide an "ideal" push-pull carrier drive, of the type previously described. The result, then, will be a small output signal across output load 19, even with no modulating voltage applied, which means there is some unbalanced voltage present. This unbalance is of course undesirable for a "balanced" modulator. According to the present invention, this unbalance is substantially entirely eliminated, and the manner in which this is accomplished will now be described.

Suppose that at a given instant the polarity on lead 3 is positive and on lead 4 is negative, and that tube 1 for some reason has a greater gain than tube 2. In the anode load 19 the alternating anode current due to tube 1 will predominate over the alternating anode current due to tube 2, giving a net alternating output voltage of negative polarity (relative to ground) across the load, since the voltages applied to grids 5 and 6 are reversed in polarity at the respective anodes 17 and 18. This negative voltage is amplified in amplifier tube 22 and appears in inverted phase at the anode 28. The A. C. component of the voltage at anode 28 is positive (relative to ground) at the moment given in the example, since the net output voltage across the load, and applied to grid 21, is then negative.

A portion of the positive A. C. component voltage output across anode resistor 29 is taken off and fed through a resistor 31 and a capacitor 32 to the cathode 7 of tube 1, and another portion of this positive A. C. component voltage is fed through a resistor 33 and a capacitor 34 to the cathode 9 of tube 2. In other words, a portion of this output voltage (positive relative to ground at the instant stated) is fed to the cathodes of tubes 1 and 2.

Let us now consider how the feedback voltage affects the alternating-current components alone of various voltages in the circuit. The net A. C. voltage effective on tube 1 is of course the voltage on its grid 5 relative to that on its cathode 7, and similarly the net A. C. voltage effective on tube 2 is of course the voltage on its grid 6 relative to that on its cathode 9. As previously stated, we are first considering the half-cycle of input voltage during which the voltage on lead 3 (grid 5) is positive with respect to ground (the central point of a push-pull input circuit is ordinarily grounded), and during which the voltage on lead 4 (grid 6) is negative with respect to ground. The grid-to-cathode voltage for each tube is the difference between the grid-to-ground and cathode-to-ground voltages for that same tube.

First considering tube 1, the positive-going grid-to-ground voltage applied to grid 5 results in a positive cathode-to-ground voltage on cathode 7, since it is a fundamental and well-known fact that there is no reversal in phase of the cathode voltage resulting from a changing grid voltage. At this same time, as previously described, a positive cathode-to-ground feedback voltage is being applied to cathode 7. The resultant cathode-to-ground voltage on cathode 7 is the vectorial summation of these two cathode-to-ground voltages, and since these voltages are both positive or in phase, such resultant is rather large. This resultant large cathode-to-ground voltage (across resistor 8), subtracted from the grid-to-ground voltage applied to grid 5, causes the grid-to-cathode voltage (the net effective input voltage on tube 1) to be considerably smaller than it would be if feedback were not utilized. This substantial reduction in the net effective input voltage of tube 1 of course results in a greatly decreased anode current flow in this tube and thus has the same effect as a decrease in gain of this tube. Then, in the anode load 19 the alternating anode current due to tube 1 is decreased. This is what is desired, since this tube has the larger gain.

Next considering tube 2, the negative-going grid-to-ground voltage applied to grid 6 results in a negative cathode-to-ground voltage on cathode 9. At this same time, a positive cathode-to-ground feedback voltage is being applied to cathode 9. The resultant cathode-to-ground voltage on cathode 9 is the vectorial summation of these two-cathode-to-ground voltages and since these voltages are in opposite senses or out of phase, such resultant will be smaller than the corresponding resultant for tube 1. This resultant smaller cathode-to-ground voltage (across resistor 10), subtracted from the grid-to-ground voltage applied to grid 6, causes the grid-to-cathode voltage (the net effective input voltage on tube 2) to be only very slightly smaller than it would be if feedback were not utilized. This inconsequential reduction in the net effective input voltage of tube 2 of course results in only an inconsequential decrease in anode current flow in this tube and thus has the same effect as an increase in gain of this tube. Then, in the anode load 19 the alternating anode current due to tube 2 is in effect increased. This is what is desired, since this tube has the smaller gain.

Originally, without feedback, under the assumed conditions the alternating anode current in the load 19 due to tube 1 predominates over that due to tube 2. However, the effect of the feedback described is to decrease greatly the anode current in tube 1 and to decrease only inconsequentially the anode current in tube 2. Thus, the feedback voltage is caused to be effective in such a direction as to tend to reduce the unbalanced voltage across the load 19 (with no modulating signal applied). In other words, since under the assumed conditions tube 1 has a greater gain than tube 2 and since the feedback voltage tends to reduce greatly the gain of tube 1 and to in effect increase the gain of tube 2, the feedback voltage tends to equalize the amplification or gain of the two modulator tubes 1 and 2. A portion of the output signal, which may appear due to improper balance adjustments even with no modulating signal, is thus fed back to the tube stages 1 and 2 and this feedback voltage in effect increases the gain of the stage with least amplification and greatly decreases the gain of the stage with greatest amplification.

At another moment (during the next half-cycle of the carrier wave excitation applied to grids 5 and 6) the polarity on lead 3 is negative and on lead 4 is positive, it being still assumed that tube 1 has a greater gain than tube 2. The voltage from cathode-to-ground appearing at cathode 7 as a result of the negative-going grid-to-ground voltage applied to grid 5 will be negative, while the voltage from cathode-to-ground appearing at cathode 9 as a result of the positive-going grid-to-ground voltage will be positive.

In the anode load 19 the alternating anode current due to tube 1 again predominates over that due to tube 2, giving a net output voltage of positive polarity across the load, due to the inherent phase reversal from grids to anodes in tubes 1 and 2. This positive voltage is inverted in phase by tube 22 and appears as a negative voltage at anode 28, which negative voltage is applied to cathodes 7 and 9.

Considering tube 1, the resultant cathode-to-ground voltage on cathode 7 is the vectorial summation of the negative feedback voltage and the negative voltage resulting from the negative-going grid-to-ground voltage applied to grid 5. Since these voltages are both negative or in phase, the resultant is rather large. Again, this resultant large cathode-to-ground voltage across resistor 8, subtracted from the grid-to-ground voltage applied to grid 5, causes the grid-to-cathode voltage of tube 1 to be considerably smaller than it would be if feedback were not utilized. Again, this substantial reduction in the net effective input voltage of tube 1 results in a greatly decreased anode current flow in this tube and thus has the same effect as a decrease in gain of this tube.

Considering tube 2, the resultant cathode-to-ground voltage on cathode 9 is the vectorial summation of the negative feedback voltage and the positive voltage resulting from the positive-going grid-to-ground voltage applied to grid 6. Since one of these voltages is negative and the other positive, they are out of phase and the resultant is rather small. Again, this quite small cathode-to-ground voltage across resistor 10, subtracted from the grid-to-ground voltage applied to grid 6, causes the grid-to-cathode voltage of tube 2 to be only very slightly smaller than it would be if feedback were not utilized. Again, this inconsequential reduction in the net effective input voltage of tube 2 results in only an inconsequential decrease in anode current flow in this tube and thus has the same effect as an increase in gain of such tube.

Again, during this half-cycle, the feedback voltage in effect increases the gain of the stage (tube 2) with least amplification and greatly decreases the gain of the stage (tube 1) with greatest amplification, tending to reduce the unbalanced voltage across anode load 19 to zero.

Now assuming a different set of conditions wherein tube 2 for some reason has a greater gain than tube 1, for the half-cycle of carrier wave energy during which the voltage on lead 3 is positive and that on lead 4 is negative the net alternating output voltage across load 19 will be of positive polarity, since now in the load 19 the alternating anode current due to tube 2 predominates over that due to tube 1 and since the polarity reverses from the grids to the anodes of tubes 1 and 2. This positive voltage is inverted in phase by tube 22 and appears as a negative voltage at anode 28, which negative voltage is applied to cathodes 7 and 9.

Conditions are now somewhat different from those previously described. Considering tube 1, the resultant cathode-to-ground voltage on cathode 7 is the vectorial summation of the negative feedback voltage and the positive voltage resulting from the positive-going grid-to-ground voltage applied to grid 5. Since one of these voltages is negative and the other positive, they are out of phase and the resultant is rather small. This quite small cathode-to-ground voltage across resistor 8, subtracted from the grid-to-ground voltage applied to grid 5, causes the grid-to-cathode voltage of tube 1 to be only very slightly smaller than it would be if feedback were not utilized. The inconsequential reduction in the net effective input voltage of tube 1 results in only an inconsequential decrease in anode current flow in this tube, providing the same effect as an increase in gain of such tube.

Considering tube 2, the resultant cathode-to-ground voltage on cathode 9 is the vectorial summation of the negative feedback voltage and the negative voltage resulting from the negative-going grid-to-ground voltage applied to grid 6. Since these voltages are both negative or in phase, the resultant is rather large. The large cathode-to-ground voltage across resistor 10, subtracted from the grid-to-ground voltage applied to grid 6, causes the grid-to-cathode voltage of tube 2 to be considerably smaller than it would be if feedback were not utilized. This substantial reduction in the net effective input voltage of tube 2 results in a greatly decreased anode current flow in this tube and thus has the same effect as a decrease in gain of such tube.

Again, the effect of the feedback voltage is to increase the gain of the stage (tube 1) with least amplification and to greatly decrease the gain of the stage (tube 2) with greatest amplification, tending to reduce the unbalanced voltage across anode load 19 to zero.

Finally considering the half-cycle of carrier wave energy during which the voltage on lead 3 is negative and that on lead 4 is positive and still assuming that tube 2 has greater gain than tube 1, the net output voltage across load 19 will be of negative polarity, since now in the load 19 the alternating anode current due to tube 2 predominates over that due to tube 1 and since the polarity reverses from the grids to the anodes of tubes 1 and 2. This negative voltage is inverted in phase by tube 22 and appears as a positive voltage at anode 28, which positive voltage is applied to cathodes 7 and 9.

Considering tube 1, the resultant cathode-to-ground voltage on cathode 7 is the vectorial summation of the positive feedback voltage and the negative voltage resulting from the negative-going grid-to-ground voltage applied to grid 5. Since one of these voltages is negative and the other positive, they are out of phase and the resultant is rather small. This quite small cathode-to-ground voltage across resistor 8, subtracted from the grid-to-ground voltage applied to grid 5, causes the grid-to-cathode voltage of tube 1 to be only very slightly smaller than it would be if feedback were not utilized. The inconsequential reduction in the net effective input voltage of tube 1 results in only an inconsequential decrease in anode current flow in this tube, providing the same effect as an increase in gain of such tube.

Considering tube 2, the resultant cathode-to-ground voltage on cathode 9 is the vectorial summation of the positive feedback voltage and the positive voltage resulting from the positive-going grid-to-ground voltage applied to grid 6. Since these voltages are both positive or in phase, the resultant is rather large. The large cathode-to-ground voltage across resistor 10, subtracted from the grid-to-ground voltage applied to grid 6, causes the grid-to-cathode voltage of tube 2 to be considerably smaller than it would be if feedback were not utilized. This substantial reduction in the net effective input voltage of tube 2 results in a greatly decreased anode current flow in this tube and thus has the same effect as a decrease in gain of such tube.

Thus, during this half-cycle the feedback voltage again in effect increases the gain of the stage with least amplification and greatly decreases the gain of the stage with greatest amplification, tending to reduce the unbalanced voltage across anode load 19 to zero.

It is desired to be reiterated here that the above description relates in all instances to the alternating components of the various voltages involved.

It may be seen from the above that when the gain of tube 2 is greater than that of tube 1, the same self-balancing takes place as when the gain of tube 1 is greater than that of tube 2, so that the substantial equalization of amplification of the two modulator tubes occurs under all conditions whenever the system is not properly balanced, with no modulating signal applied. Since the feedback of this invention opposes the unbalance produced by the system, it may be termed negative feedback.

A suitable source of modulating signals supplies modulating signals in push-pull relation to the respective modulation input terminals 35, 36. The modulating signals may be of any desired type and may be either A. C. or D. C. signals. If the latter, signals of opposite polarities are supplied to the two terminals 35, 36. Terminal 35 is coupled through a resistor 37 to grid 5 and through a resistor 38 to ground. A capacitor 39 is connected across resistor 38. Terminal 36 is coupled through a resistor 40 to grid 6 and through a resistor 41 to ground. A capacitor 42 is connected across resistor 41.

If a low frequency modulating voltage is applied in push-pull to the terminals 35 and 36, the bias on the tubes 1 and 2 will vary rhythmically as the modulating signal. The $g_m$ of the tubes is also caused to vary rhythmically as the modulating signal. During a certain time interval, say when the modulating signal goes positive and decreases the bias on tube 1, the carrier frequency current through the same tube increases. Simultaneously, the bias on tube 2 increases, and also the carrier frequency current in tube 2 decreases. This upsets the balance of the modulator, and across the common anode load 19 a carrier frequency signal appears, having a certain reference phase and an amplitude proportional to amplitude of the modulating voltage.

During another time interval, when the modulating signal goes negative and increases the bias on tube 1, the carrier frequency through the same tube decreases. However, at this time the bias on tube 2 decreases and the carrier frequency current in tube 2 increases. Across the common anode load 19 we again have a certain carrier frequency signal, but this time 180° out of phase with the carrier signal which appeared across this load when the modulating signal on tube 1 was going positive.

In short, when a modulating signal is applied to the circuit of Fig. 1, there appears in the output load 19 a carrier frequency signal whose amplitude varies as the amplitude of the modulating signal. When the modulating signal goes through zero, or changes polarity, the amplitude of the output carrier frequency signal goes through zero and the phase changes 180°. Thus, a modulated output signal appears in the load 19 in response to modulating signal applied to the signal input terminals 35, 36. The modulated signal voltage may be expressed as follows:

$$e=\sin \omega_c t \times \sin \omega_m t \qquad (1)$$

where $\omega_c$ is the carrier frequency and $\omega_m$ the modulating signal. This can be rewritten as $$e=\tfrac{1}{2} \cos (\omega_c t-\omega_m t)-\tfrac{1}{2} \cos (\omega_c t+\omega_m t) \qquad (2)$$

Equation 2 is the rather well-known expression for the sideband frequency components of an amplitude modulated signal, in which components we are interested.

With the negative feedback arrangement of this invention, part of the modulated output signal thus appearing in load 19 (due to a modulating signal applied to modulating input terminals 35 and 36) is amplified and inverted in phase in tube 22 and is fed back to the two cathodes 7 and 9, with such a relative phase as to tend to equalize the amplification of the two modulator tubes 1 and 2. This again may be termed negative feedback. When a modulating signal is applied to the modulating signal input, the circuit disclosed will thus tend to compensate for unequal mutual conductance characteristics of the tubes 1 and 2, thereby linearizing the modulation characteristic of the modulator as a whole. The action of the feedback signal, to tend to equalize the amplification of the two modulator tubes, occurs in exactly the same manner with a modulating signal as that described above for unbalance but no modulating signal, so the description will not be repeated here.

Figure 2:
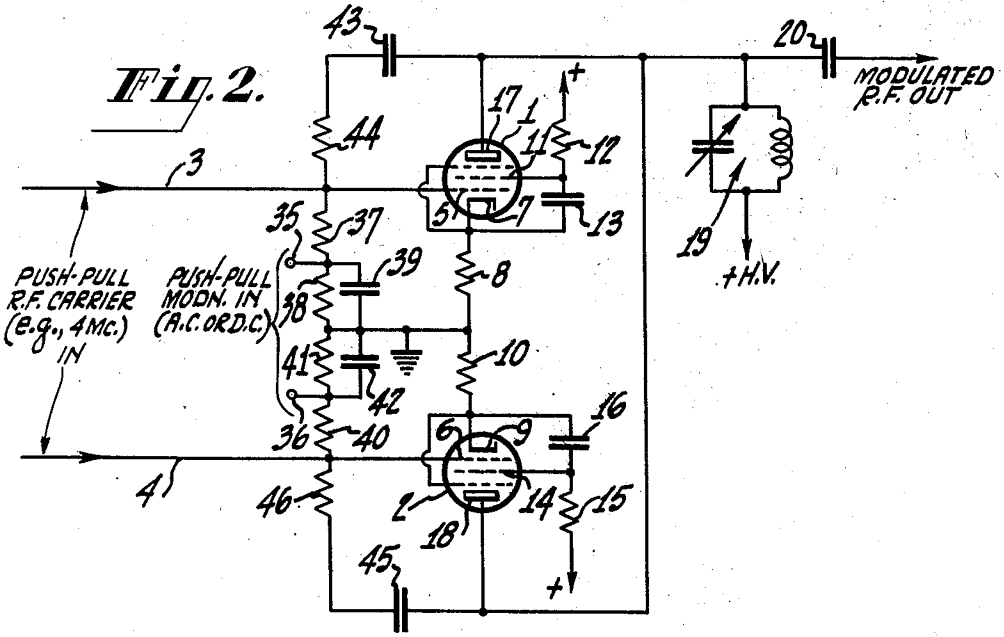
Fig. 2 is a circuit diagram of another embodiment.

Fig. 2 discloses another embodiment of the invention, a different arrangement for applying negative feedback. This arrangement has a slight drawback as compared to Fig. 1, in that the Fig. 2 arrangement lowers the input resistance to the balanced modulator. In Fig. 2, elements the same as those of Fig. 1 are denoted by the same reference numerals. In Fig. 2, the output amplifier and phase inverter tube 22 of Fig. 1 is not utilized, but the output signal in the common anode load 19 is instead applied through a coupling capacitor 20 directly to a suitable utilization circuit.

In the Fig. 2 embodiment, negative feedback is effected from anode 17 of tube 1 through a capacitor 43 and a resistor 44 to the control grid 5, and negative feedback is effected from anode 18 of tube 2 through a capacitor 45 and a resistor 46 to the control grid 6.

In Fig. 2, for simplicity let us first assume that the modulating voltage is zero, or in other words that no modulating voltage is applied. First consider the half-cycle during which the carrier voltage is positive on grid 5 of tube 1 and negative on grid 6 of tube 2. If tube 1 for some reason has more gain than tube 2, in load 19 the alternating anode current due to tube 1 will predominate over that due to tube 2 and since there is a phase reversal from grids to anodes of tubes 1 and 2, the voltage in output load 19 will have negative polarity.

A portion of this negative voltage is fed back to the two grids 5 and 6. This negative feedback voltage will be in phase opposition to the applied positive carrier on grid 5 of tube 1 and will reduce the output of this tube, which has greatest gain. On grid 6 of tube 2, the negative feedback voltage will be in phase with the applied negative carrier, increasing the output from tube 2, which has least gain. The result of these two effects will be a tendency to reduce any output signal (unbalance) in load 19 to zero.

Next consider the following half-cycle, during which the carrier voltage is negative on grid 5 and positive on grid 6, it still being assumed that tube 1 has more gain than tube 2. In load 19 the alternating anode current due to tube 1 will again predominate over that due to tube 2, and because of the phase reversal the voltage in said load will now have positive polarity. This positive feedback voltage will again be in phase opposition to the applied negative carrier on grid 5 of tube 1 and will again reduce the output of this tube, which has greatest gain. On grid 6 of tube 2, the positive feedback voltage will again be in phase with the applied positive carrier, increasing the output from tube 2, which has least gain. The result of these two effects will again be a tendency to reduce any output signal (unbalance) in load 19 to zero.

Similar reasoning applies if tube 2 has more gain than tube 1, and the circuit operates similarly to tend to equalize the amplification of the two modulator tubes 1 and 2. If tube 2 has more gain than tube 1, for the half-cycle of carrier during which the carrier voltage is positive on grid 5 and negative on grid 6, the voltage in output load 19 will have positive polarity. The positive feedback voltage will be in phase with the applied positive carrier on grid 5 of tube 1 and will increase the output of this tube, which has least gain. The positive feedback voltage will be in phase opposition to the applied negative carrier on grid 6 of tube 2 and will reduce the output of this tube, which has greatest gain. This tends to reduce any output signal in load 19 due to unbalance, to zero.

For the half-cycle of carrier during which the carrier voltage is negative on grid 5 and positive on grid 6, if tube 2 has more gain than tube 1 the voltage in output load 19 will have negative polarity. The negative feedback voltage will again be in phase with the applied negative carrier on grid 5 of tube 1 and will increase the output of this tube, which has least gain. The negative feedback voltage will again be in phase opposition to the applied positive carrier on grid 6 of tube 2 and will reduce the output of this tube, which has greatest gain. This again tends to reduce any output signal in load 19 due to unbalance, to zero. Since the feedback thus opposes the unbalance produced by the system, it may be termed negative feedback.

The application of a low frequency modulating voltage (which may be either A. C. or D. C.) in push-pull to terminals 35 and 36 in Fig. 2 unbalances the balanced modulator in exactly the same manner as previously described in connection with Fig. 1, so that a modulated output signal appears across output load 19.

The negative feedback arrangement of Fig. 2 operates similarly to that of Fig. 1, when modulating voltage is applied to the modulating input terminals 35 and 36. A portion of the modulated output signal appearing in load 19 (due to a modulating signal applied to modulating input terminals 35 and 36) is fed back to the two control grids 5 and 6, with such a relative phase as to tend to equalize the amplification of the two modulator tubes 1 and 2. This again may be termed negative feedback. When a modulating signal is applied to the modulating signal input of Fig. 2, the circuit will thus tend to compensate for unequal mutual conductance characteristics of the tubes 1 and 2, thereby linearizing the modulation characteristic of the modulator as a whole. The action of the feedback signal in Fig. 2, to tend to equalize the amplification of the two modulator tubes, occurs in exactly the same manner with a modulating signal as that described above for unbalance but no modulating signal, so the description will not be repeated here.

In circuit arrangements built according to Figs. 1 and 2 and successfully tested at 4 mc., certain of the components had the following values, which are given by way of example.

| | |
|---|---|
| Resistor 8 | 200 ohms. |
| Resistor 10 | 200 ohms. |
| Resistor 29 | 4300 ohms. |
| Resistor 31 | 11 K ohms. |
| Resistor 33 | 11 K ohms. |
| Resistor 37 | 100 K ohms. |
| Resistor 38 | 100 K ohms. |
| Resistor 40 | 100 K ohms. |
| Resistor 41 | 100 K ohms. |
| Resistor 44 | 0.47 megohm. |
| Resistor 46 | 0.47 megohm. |
| Capacitor 32 | 1500 mmfd. |
| Capacitor 34 | 1500 mmfd. |
| Capacitor 43 | 1500 mmfd. |
| Capacitor 45 | 1500 mmfd. |

Although the tube operation in the tested circuit arrangements was class A, the invention is equally applicable to tubes operating class B or class C. The invention was actually tested and used as a phase-shifter, wherein the "modulating signal" applied to input terminals 35 and 36 was actually a D. C. signal, the signals applied to the respective control grids 5 and 6 being of opposite polarity.

What is claimed is:

1. A balanced modulator comprising two electron discharge devices each of which has input electrodes and also output electrodes, means connecting the output electrodes of said devices in parallel to a common load, means for supplying carrier wave energy in push-pull relation to the respective input electrodes of said devices, means for supplying push-pull modulating voltages to the respective input electrodes of said devices, said modulator becoming unbalanced and causing a modulated carrier wave to appear across said load in response to modulating voltages and as a result of unavoidable inequalities arising in the circuits of said devices, and means capable of passing only alternating current for feeding back a portion of the modulated carrier wave appearing across said load to said devices in such phase as to reduce the modulated carrier wave appearing across said load.

2. A balanced modulator comprising two electron discharge devices each of which has input electrodes and also output electrodes, means connecting the output electrodes of said devices in parallel to a common load, means for supplying carrier wave energy in push-pull relation to the respective input electrodes of said devices, means for supplying push-pull modulating voltages to the respective input electrodes of said devices, said modulator becoming unbalanced and causing a modulated carrier wave to appear across said load in response to modulating voltages and as a result of unavoidable inequalities arising in the circuits of said devices, and means for feeding back a portion of the modulated carrier wave appearing across said load symmetrically to both of said devices in such phase as to reduce the modulated carrier wave appearing across said load.

3. A balanced modulator comprising two electron discharge devices each of which has an anode electrode, a cathode electrode, and a control electrode, means connecting the two anode electrodes in parallel to a common load, means for supplying carrier wave energy in push-pull relation to the two respective control electrodes, means for supplying push-pull modulating voltages to the two respective control electrodes, said modulator becoming unbalanced and causing a modulated carrier wave to appear across said load in response to modulating voltages and as a result of undesired inequalities arising in the circuits of said devices, and means capable of passing only alternating current for feeding back a portion of the modulated carrier wave appearing across said load to said devices in such phase as to reduce the modulated carrier wave appearing across said load.

4. A balanced modulator comprising two electron discharge devices each of which has an anode electrode, a cathode electrode, and a control electrode, means connecting the two anode electrodes in parallel to a common load, means for supplying carrier wave energy in push-pull relation to the two respective control electrodes, means for supplying push-pull modulating voltages to the two respective control electrodes, said modulator becoming unbalanced and causing a modulated carrier wave to appear across said load in response to modulating voltages and as a result of undesired inequalities arising in the circuits of said devices, and means for feeding back, from a single point on said load, a portion of the modulated carrier wave appearing across said load symmetrically to the cathode electrodes of both of said devices in such phase as to reduce the modulated carrier wave appearing across said load.

5. A balanced modulator comprising two electron discharge devices each of which has an anode electrode, a cathode electrode, and a control electrode, means connecting the two anode electrodes in parallel to a common load, means for supplying carrier wave energy in push-pull relation to the two respective control electrodes, means for supplying push-pull modulating voltages to the two respective control electrodes, said modulator becoming unbalanced and causing a modulated carrier wave to appear across said load in response to modulating voltages and as a result of undesired inequalities arising in the circuits of said devices, an amplifying electron discharge device, a connection between a single point on said load and the input of said amplifying device, and means coupling the output of said amplifying device symmetrically to the cathode electrodes of both of said devices, thereby to feed back a portion of the modulated carrier wave appearing across said load in such phase as to reduce the modulated carrier wave appearing across said load.

6. A balanced modulator comprising two electron discharge devices each of which has an anode electrode, a cathode electrode, and a control electrode, means connecting the two anode electrodes in parallel to a common load, means for supplying carrier wave energy in push-pull relation to the two respective control electrodes, means for supplying push-pull modulating voltages to the two respective control electrodes, said modulator becoming unbalanced and causing a modulated carrier wave to appear across said load in response to modulating voltages and as a result of undesired inequalities arising in the circuits of said devices, and separate couplings between a single point on said load and the control electrodes of both of said devices, thereby to feed back a portion of the modulated carrier wave appearing across said load in such phase as to reduce the modulated carrier wave appearing across said load.

References Cited in the file of this patent

UNITED STATES PATENTS

| | | |
|---|---|---|
| 2,186,958 | Collins | Jan. 16, 1940 |
| 2,227,157 | Roder | Dec. 31, 1940 |
| 2,361,198 | Harmon et al. | Oct. 24, 1944 |

FOREIGN PATENTS

| | | |
|---|---|---|
| 322,294 | Great Britain | Dec. 5, 1929 |